Figure 1:
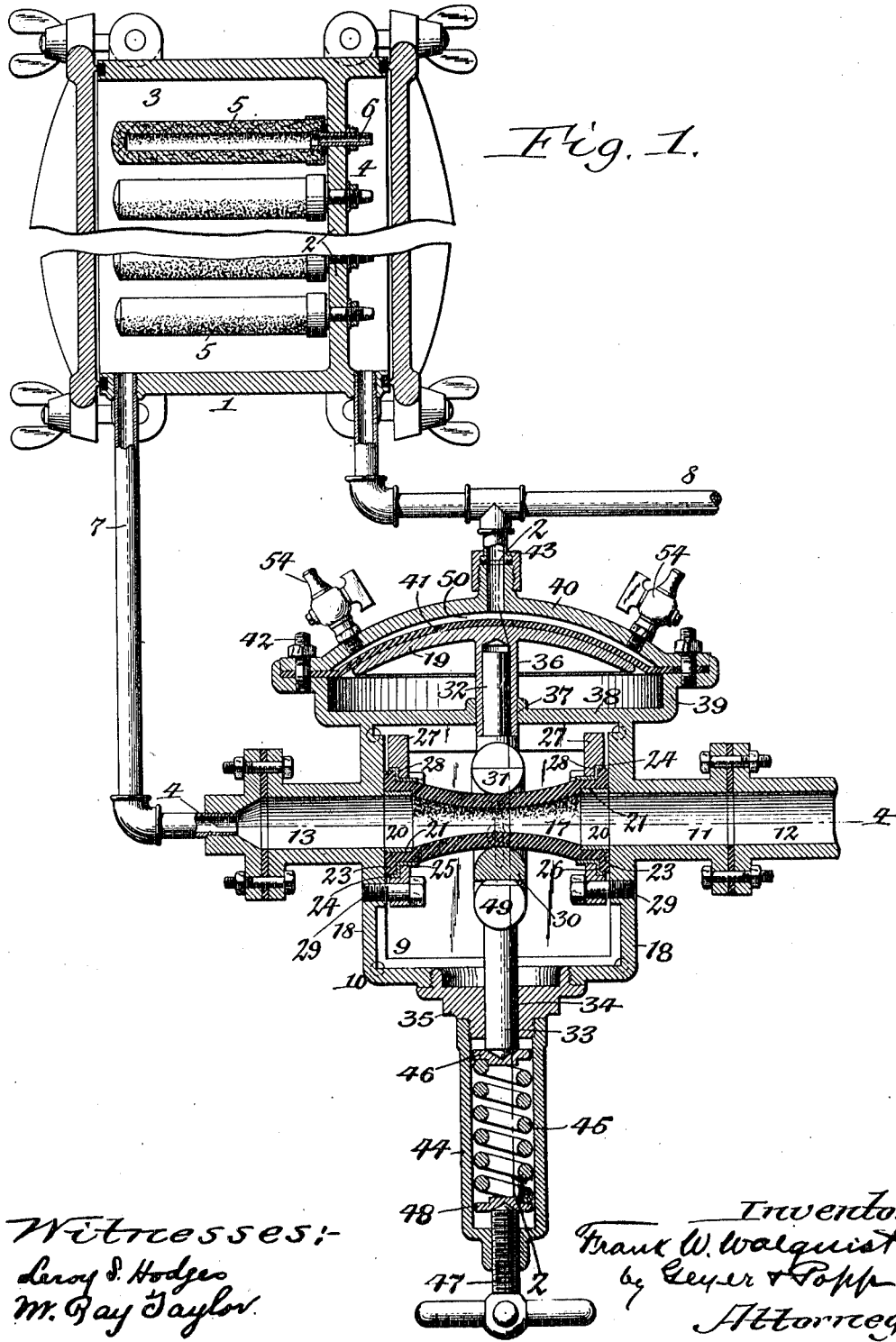

F. W. WALQUIST.
PRESSURE REGULATOR.
APPLICATION FILED APR. 3, 1912.

1,120,002.

Patented Dec. 8, 1914.

2 SHEETS—SHEET 1.

Witnesses:-
Leroy S. Hodges
M. Ray Taylor

Inventor
Frank W. Walquist
by Geyer & Popp
Attorneys

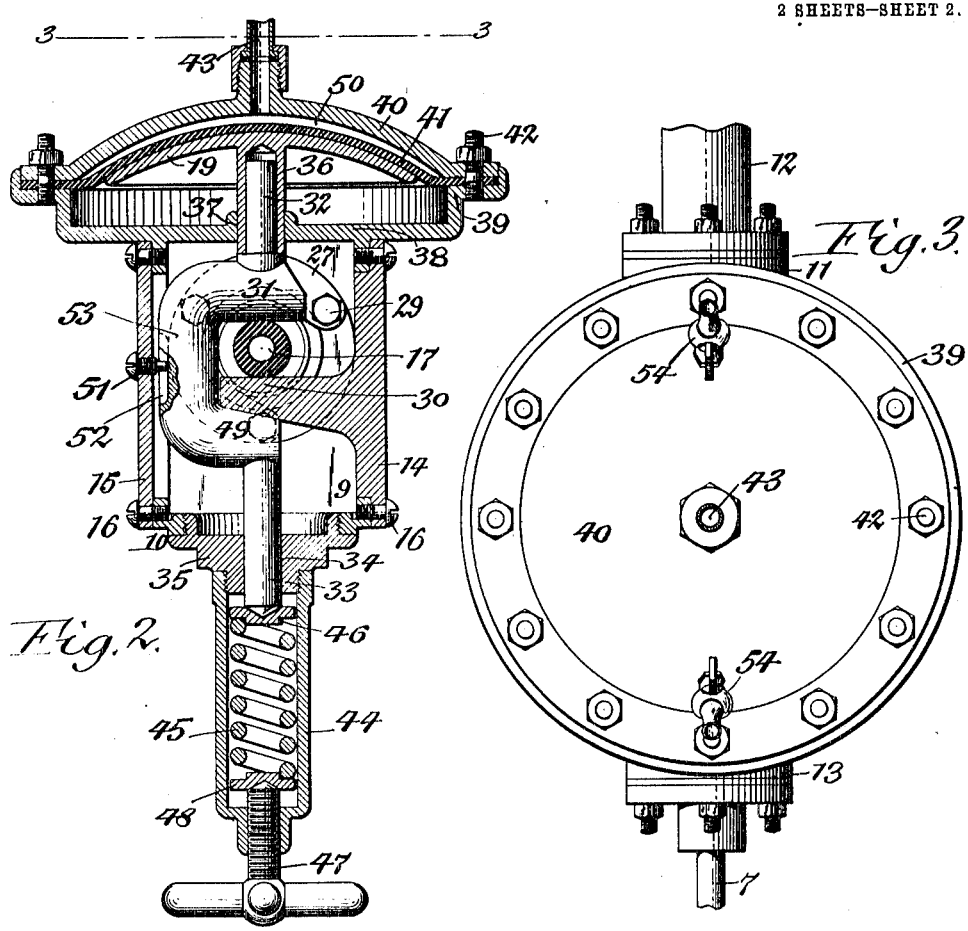
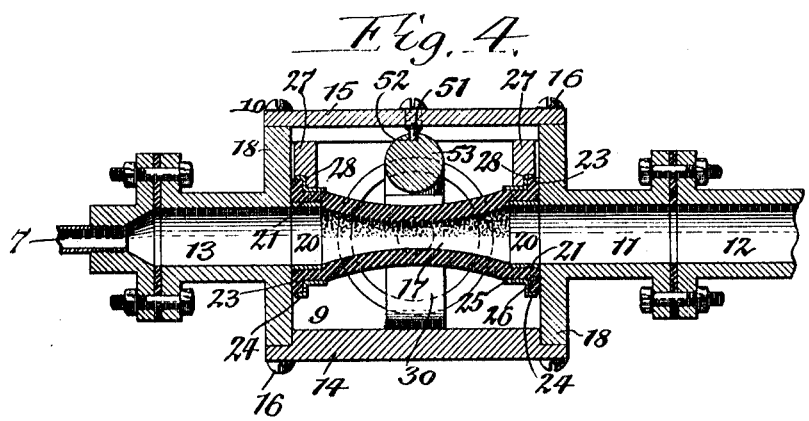

UNITED STATES PATENT OFFICE.

FRANK W. WALQUIST, OF BUFFALO, NEW YORK, ASSIGNOR TO ZAHM MANUFACTURING COMPANY, OF BUFFALO, NEW YORK, A CORPORATION OF NEW YORK.

PRESSURE-REGULATOR.

1,120,002.  Specification of Letters Patent.  Patented Dec. 8, 1914.

Application filed April 3, 1912. Serial No. 688,264.

*To all whom it may concern:*

Be it known that I, FRANK W. WALQUIST, a citizen of the United States, residing at Buffalo, in the county of Erie and State of New York, have invented new and useful Improvements in Pressure-Regulators, of which the following is a specification.

This invention relates to a pressure regulator which is more particularly designed for regulating the supply of a liquid containing micro-organisms, as for instance in the case of regulating the supply of beer to a filter which is intended to remove from the beer any particles in suspension therein. Such regulators require occasional cleaning in order to maintain the same in perfect sanitary condition and prevent possible contamination of the beer by reason of any micro-organism which by chance may become lodged in the regulator.

It is the object of this invention to provide a regulator for this purpose which is not only simple in construction and efficient in operation but also reduces to a minimum the surface with which the beer contacts in passing through the regulator, these surfaces being arranged in a conduit which is substantially straight so as to permit not only of thoroughly and rapidly cleaning the beer conducting passages but also avoiding any sudden turns of the liquid so that the tendency to foam the beer is avoided.

In the accompanying drawings consisting of 2 sheets: Figure 1 is a vertical section of my improved pressure regulator associated with a liquid filter. Fig. 2 is a vertical section taken in line 2—2, Fig. 1. Fig. 3 is a horizontal section taken in line 3—3, Fig. 2. Fig. 4 is a horizontal section taken in line 4—4, Fig. 1.

Similar characters of reference indicate corresponding parts throughout the several views.

In order to illustrate one of the various uses to which my improved pressure regulator may be put the same is shown in Fig. 1 in connection with a filter which is designed to separate from a liquid, such as beer, any matter which may be in suspension therein. The filter for this purpose which is shown in the drawings, as an example, comprises a hollow shell or body 1 which is divided by a partition 2 into an inlet chamber 3 for the unfiltered liquid and an outlet chamber 4 for the filtered liquid, and a plurality of porous filter tubes 5 arranged within the inlet chamber and each having a tubular neck 6 secured in an opening in the partition and leading from the interior of the respective filter tube to the outlet chamber. The liquid to be filtered is supplied to the inlet chamber by means of a pipe or conduit 7 and passes thence inwardly through the several filter tubes, thence through the necks thereof into the outlet chamber and thence through a delivery pipe 8 to the place of consumption.

My improved pressure regulator is designed to maintain a constant low pressure on the liquid on the outlet or low pressure side of the filter regardless of the higher pressure to which the liquid is subjected as it comes from the source of supply.

The body 10 of the regulator is constructed to form a valve chamber 9 which is provided at one end with an inlet nipple 11 which is connected with a pipe or conduit 12 adapted to supply the liquid to be filtered, and at its opposite end with an outlet nozzle 13 which is connected with the pipe 7 leading to the inlet chamber of the filter. On its opposite sides the valve body is provided with removable covers or walls 14, 15 which are detachably secured to the main part of the body by means of screws 16 or otherwise so as to permit of access to the interior of the valve chamber for the purpose of assembling and dismembering the regulator and cleaning, inspecting or repairing the same.

Extending across the valve chamber from the inlet nipple to the outlet nipple is an elastic valve tube 17 which is adapted to conduct the liquid from the inlet nipple to the outlet nipple and which is adapted to expand or to be contracted more or less for the purpose of either cutting off the flow of liquid through the regulator or to vary the amount of liquid passing through the regulator in accordance with the requirements on the low pressure side of the same. This valve tube is preferably constructed of rubber and is contracted or narrow at its central part and flares or enlarges toward its opposite ends so as to form in effect a double hollow cone the inner ends of which are joined while the outer enlarged ends are secured to the adjacent walls 18, 18 of the valve body around the inlet and outlet nipples thereof. Various means may be employed for connecting the ends of the valve tube with the end walls of the valve body so as to prevent the ends of this tube from collapsing and also to prevent leakage between the tube and the valve body, as well as to permit ready removal of this tube from said body for renewing the same in case the same is worn out or becomes inoperative.

The means shown in the drawings for connecting the ends of the valve tube with the inner sides of the end walls of the valve body are preferred and are constructed as follows:—20, 20 represent two retaining or spreading tubes which are arranged in internal annular rabbets 21 formed in the bore of the valve tube at opposite ends thereof and which are constructed of metal or similar material so as to prevent the ends of the valve tube from collapsing. These retaining or spreading tubes have their bores constructed of the same diameter as the bores of the inlet and outlet nipples so as to form practically continuations thereof, whereby the formation of shoulders, pockets or recesses in the conduit for the liquid to be filtered are avoided and a practically straight run or passageway for such liquid is provided as it passes through the regulator, thereby avoiding undue agitation or roiling of the beer or other liquid which otherwise would be apt to render the same cloudy.

At opposite ends the valve tube is provided with external annular flanges 23 which are formed integrally on the tube and bear against the inner sides of the respective end walls 18, 18 of the valve body around the inlet and outlet nipples. At each of its ends the valve tube is provided with a metal ferrule which comprises an outer enlarged cylindrical sleeve 24 engaging with the periphery of the adjacent external valve flange, an inner reduced cylindrical sleeve 25 which surrounds the valve tube adjacent to the external flange and an annular radial web 26 connecting the corresponding inner edges of the outer and inner sleeve and bearing against the inner side of the respective valve flange.

27 represents a C-shaped clamping cap of metal which surrounds the greater part of the inner reduced sleeve of the ferrule and is provided on its outer side with an internal rabbet 28 which engages with the shoulder formed by the web and enlarged outer sleeve of the ferrule. This clamping cap is connected with the adjacent end wall of the valve body by a plurality of clamping screws 29. By constructing the clamping cap of C-shaped or crescent form it is possible to readily and conveniently apply the same to or remove the same from the valve tube and the respective ferrule while the tube is arranged axially in line with the inlet and outlet nipples and by employing the metal ferrule which completely surrounds the valve tube the pressure of the clamping cap is brought to bear substantially all the way around against the valve tube flange so that a perfectly tight joint between the tube and valve body is produced and leakage is absolutely prevented.

The valve tube is so constructed that when in its normal or relaxed condition the same is expanded to its fullest extent and is retained in this condition by its natural resilience in which it provides the maximum flow of liquid through the regulator from the inlet nipple to the outlet nipple thereof. For the purpose of reducing the flow of the liquid through the valve tube the latter is contracted at its central part by pressing the same inwardly from diametrically opposite sides in the manner of a pinch cock, thereby reducing the cross sectional area of the liquid passageway and the capacity of the same accordingly. This compression or contraction of the valve tube is effected automatically and by means of pressure derived from the liquid which passes or has passed through the valve tube. The preferred means for this purpose are shown in the drawings and constructed as follows:—30 represents a stationary presser jaw which engages with the central part of the valve tube at the center thereof and at one part of its periphery and which is preferably formed integrally with the removable cover 14 of the valve chamber, as shown in Fig. 2. Within the valve chamber is arranged a yoke which is preferably C-shaped and has its upper end constructed to form a movable presser jaw 31 which engages with the outer upper side of the valve tube diametrically opposite to where the fixed jaw 30 engages with the underside of this tube. The upper and lower ends of the yoke are provided respectively with upwardly and downwardly projecting guide stems 32, 33 the lower one 33 of which slides in a vertical opening or guideway 34 formed in a screw plug 35 secured in the bottom or underside of the valve body, while the upper stem engages with the inner side of a tubular shank 36 which is guided in an opening or guideway 37 formed in the top or upper side 38 of the valve body.

On its upper side the valve body is provided with an annular flange or rim 39 forming an upwardly opening cavity or chamber on this body. Above the annular flange 39 is arranged an outwardly dished or cap-shaped head 40 and between this cap and the flange of the valve body is secured a flexible diaphragm 41 of rubber or similar material so as to form a regulating chamber 50 between this cap and the diaphragm. The marginal edges of the body flange 39, the diaphragm and the head 40 are preferably detachably connected by means of bolts 42, as shown, although any other suitable means may be employed for this purpose, if desired. On its inner side the diaphragm 41 bears against a presser disk 19 which is preferably curved and of concavo-convex form and constructed integrally with the outer end of the guide shank 36 so that any inward pressure exerted against the outer side of the diaphragm causes the movable jaw of the yoke to be moved inwardly for contracting the valve tube. The regulating chamber 50 is placed in communication with the outlet or low pressure side of the regulator, preferably, by means of a branch pipe 43 leading from the outlet pipe of the filter to the regulating chamber, as shown in Fig. 1.

In order to cause the movable presser jaw to be promptly lifted from the valve tube and permit the latter to expand by its resilience when the pressure in the regulating chamber is removed or reduced, a yielding opening device is provided which preferably comprises a guide tube 44 connected at its inner end by a screw joint in the screw plug 35, a spring 45 arranged in this guide tube and bearing at its inner end by means of an interposed washer 46 against the lower end of the lower guide stem, and an adjusting screw 47 working in a threaded opening at the outer end of the guide tube and bearing by means of an interposed washer 48 against the outer end of the tension spring 45. The upward or opening movement of the yoke under the action of the spring 45 is preferably limited by utilizing the lower end 49 of the yoke as a stop which engages with the underside of the stationary presser jaw 30, as shown in Fig. 2.

Turning of the yoke within the valve chamber is prevented although the same is free to reciprocate lengthwise by means of a feather or spline 51 which is constructed in the form of a screw or pin arranged on the removable wall 15 of the valve chamber and engaging with a longitudinal slot or groove 52 in the outer side of the cross bar 53 of the C-shaped yoke.

When assembling the regulator the tension of the spring is adjusted by means of the screw 47 in accordance with the liquid pressure desired on the low pressure side of the regulator. So long as the pressure on the low pressure side of the regulator remains at the predetermined normal point the movable jaw will be yieldingly held in its farthest position away from the valve tube by the action of the spring 45, thereby permitting the valve tube owing to its resilience to remain in a wide open position. When, however, the pressure of the liquid or other medium on the low pressure side of the regulator exceeds the normal point at which the regulator has been set this excess pressure operating in the regulating chamber on the outer side of the diaphragm causes the latter and the parts associated therewith to be pushed inwardly or downwardly in opposition to the regulating spring 45 which at this time is overcome, thereby causing the movable jaw of the yoke to exert a pressure against the valve tube and contract the latter, thereby reducing the capacity of this tube and the flow of the liquid through the same so that the pressure on the low pressure side of the regulator is reduced. When the liquid pressure on the low pressure side of the regulator has again dropped to normal the pressure within the regulating chamber is reduced more or less, thereby permitting the spring 45 to again move the movable presser jaw away from the valve tube so as to permit the latter to expand and restore the normal supply of liquid from the high pressure to the low pressure side of the regulator.

During the operation of cleaning this regulator it is only necessary to detach the inlet and outlet nipples thereof from the supply and delivery pipes, inasmuch as in this condition of the regulator it is possible for the attendant to thoroughly clean the liquid passage through the regulator by simply passing a brush straight through the regulator. This operation will thoroughly remove all sediment or coating from this passage because the same is a straight run and therefore permits all parts of this passageway to be reached easily and conveniently.

In addition to brushing or wiping out the passageway of the regulator the same is sterilized at frequent intervals by passing a sterilizing liquid such as water at a sterilizing temperature through the same, which water is also passed through the filter tubes of the filter so that the latter are also sterilized at this time.

Inasmuch as the body of liquid or other medium in the regulating chamber is not in circulation and therefore liable to contaminate the filtered liquid delivered from the filter if any infection should occur within the regulating chamber, means are provided for passing sterilizing liquid also through this chamber at proper intervals. The preferred means for this purpose consists of one or more blow-off valves or cocks 54 arranged on the head of the regulating chamber adjacent to the margin thereof. These cocks or valves are opened while the sterilizing liquid is passed through the regulator and the filter, thereby causing some of this liquid to pass through the branch pipe and regulating chamber and escape through the blow-off cocks whereby any micro-organism or other undesirable matter is either rendered sterile or washed out of the regulating chamber and prevented from setting up an infection. After the regulating chamber has been thus cleaned and sterilized, the blow-off cocks are again closed for restoring the normal condition of the apparatus.

My improved regulator is not only more sanitary and capable of being more easily cleaned than regulators for this purpose as heretofore constructed, but the same is also very much simpler in construction, it can be produced at lower cost, it can be more readily adjusted, and the parts are also more convenient of access for inspection and repairing.

I claim as my invention:

1. A pressure regulator comprising a body having inlet and outlet nipples, a contractible valve tube connected at its opposite ends with said inlet and outlet nipples, a yoke having a presser jaw engaging with the side of said tube between the ends thereof and provided on opposite sides of said tube with guide stems which slide in ways on said body, a regulating chamber communicating with said outlet nipple, and a diaphragm exposed to the pressure of the medium in said regulating chamber and operating on said yoke.

2. A pressure regulator comprising a body having inlet and outlet nipples, a contractible valve tube connected at its opposite ends with said inlet and outlet nipples, a yoke having a presser jaw engaging with the side of said tube between the ends thereof and provided on opposite sides of said tube with guide stems which slide in ways on said body, a regulating chamber communicating with said outlet nipple, a flexible diaphragm exposed to the pressure of the medium in said chamber, and a curved presser disk engaging with said diaphragm and connected with said yoke.

3. A pressure regulator comprising a body having inlet and outlet nipples, a contractible valve tube connected at its opposite ends with said inlet and outlet nipples, a yoke having a presser jaw engaging with the side of said tube between the ends thereof and provided on opposite sides of said tube with guide stems which slide in ways on said body, a regulating chamber communicating with said outlet nipple, a diaphragm exposed to the pressure of the medium in said chamber and operating on one stem of said yoke moving the presser jaw toward said tube, and a spring operating on the other stem of the yoke for moving said jaw away from said tube.

4. A pressure regulator comprising a body having inlet and outlet nipples, a contractible valve tube connected at its opposite ends with said inlet and outlet nipples, a yoke having a presser jaw engaging with the side of said tube between the ends thereof and provided on opposite sides of said tube with guide stems which slide in ways on said body, a regulating chamber communicating with said outlet nipple, a fixed jaw arranged on said body and engaging with said tube opposite the movable jaw and a diaphragm exposed to the pressure of the medium in said regulating chamber and operating on said yoke.

5. A pressure regulator comprising a body having inlet and outlet nipples, a contractible valve tube connected at its opposite ends with said inlet and outlet nipples, a yoke having a presser jaw engaging with the side of said tube between the ends thereof and provided on opposite sides of said tube with guide stems which slide in ways on said body, a regulating chamber communicating with said outlet nipple, means for holding said yoke against turning comprising a pin arranged on the body and projecting into a longitudinal slot in said yoke, and a diaphragm exposed to the pressure of the medium in said regulating chamber and operating on said yoke.

6. A pressure regulator comprising a body having inlet and outlet nipples, a contractible valve tube connected at its opposite ends with said inlet and outlet nipples, a yoke having a presser jaw engaging with the side of said tube between the ends thereof and provided on opposite sides of said tube with guide stems which slide in ways on said body, a regulating chamber communicating with said outlet nipple, a fixed jaw arranged on said body and engaging with said tube opposite the movable jaw and provided at its ends with external flanges, ferrules engaging with the ends of said tube and the flanges thereof, and clamping caps engaging the shoulders of said ferrules and detachably connected with said body, and means for contracting said tube by pressure derived from the medium passing through said tube.

7. A pressure regulator comprising a body having inlet and outlet nipples, a contractible valve tube connected at its opposite ends with said inlet and outlet nipples, a yoke having a presser jaw engaging with the side of said tube between the ends thereof and provided on opposite sides of said tube with guide stems which slide in ways on said body, a regulating chamber communicating with said outlet nipple, a fixed jaw arranged on said body and engaging with said tube opposite the movable jaw and provided at its ends with external flanges, shouldered ferrules engaging with the ends of the valve tube and the flanges thereof, and clamping caps having rabbets engaging said shouldered ferrules and detachably connected with said body.

Witness my hand this 28th day of March, 1912.

FRANK W. WALQUIST.

Witnesses:
 EDWARD ZAHM,
 ANNA HEIGIS.